United States Patent [19]

Hartsing, Jr. et al.

[11] Patent Number: 4,649,176

[45] Date of Patent: Mar. 10, 1987

[54] SERVING TRAY ARTICLE COMPRISING A BLEND OF A SULFONE, STYRENE AND A POLYCARBONATE

[76] Inventors: Tyler F. Hartsing, Jr., 2404 Bryant Ave., Westfield, N.J. 07090; Marvin E. Sauers, Township Line Rd., #1, Belle Mead, N.J. 08502

[21] Appl. No.: 818,560

[22] Filed: Jan. 13, 1986

[51] Int. Cl.$^4$ .................. C08L 69/00; C08L 51/00
[52] U.S. Cl. ................................ 525/67; 525/69; 525/146; 525/147
[58] Field of Search ............... 525/67, 147, 468, 392, 525/535, 69

[56] References Cited

U.S. PATENT DOCUMENTS

| | | | |
|---|---|---|---|
| 4,510,289 | 4/1985 | Fox et al. | 525/148 |
| 4,532,288 | 7/1985 | Robeson | 524/375 |
| 4,564,654 | 1/1986 | Serini et al. | 525/67 |

Primary Examiner—Theodore E. Pertilla
Attorney, Agent, or Firm—Donald M. Papuga; William H. Magidson

[57] ABSTRACT

A serving tray suitable for institutional use and characterized by excellent physical and mechanical properties, including impact resistance and resistance to water spotting. The tray comprises a blend of a sulfone, styrene and a polycarbonate.

9 Claims, No Drawings

SERVING TRAY ARTICLE COMPRISING A BLEND OF A SULFONE, STYRENE AND A POLYCARBONATE

FIELD OF THE INVENTION

This invention is directed to a serving tray article comprising a blend of a poly(aryl ether)sulfone, a styrene polymer and a compatabilizing amount of a polycarbonate.

BACKGROUND OF THE INVENTION

Serving trays such as those used in hospitals to carry food and keep it warm during transport from the hospital kitchen to the patient, as well as to compartmentalize and hold various dishes of food during the patient's meal, have conventionally been made of an alloy of polycarbonate and a styrene compound. These conventional trays do not provide good performance with respect to certain characteristics required of institutional serving trays, including chemical resistance to detergents and rinse aids, heat resistance and resistance to bulging on exposure to hot food and food dishes, and impact resistance sufficient to withstand the various handling steps encountered in a hospital food processing environment. In an effort to overcome these deficiencies, certain conventional serving trays have been coated with a PET overlayer film, but this overlayer provides only a marginal improvement in properties and does not provide as durable and long-lasting a serving tray as would be desireable.

THE INVENTION

It has now been found that a serving tray comprising a blend of a poly(aryl ether)sulfone, a styrene polymer, and a compatabilizing amount of a polycarbonate provides a significant improvement in the physical and chemical characteristics of the tray as compared to the characteristics of the above described conventional PET coated serving tray.

The poly(ether sulfone) suitable for use in this invention include homopolymers, co- and higher polymers having repeating units of the following formula.

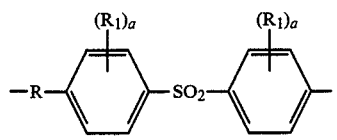

Wherein R is selected from O and S, each $R_1$ is independently hydrogen, a halogen atom, an alkyl groups of from 1 to 4 carbon atoms and a is an integer of 0 to 4.

Preferably, the poly(ether sulfone) has repeating units of the following formula:

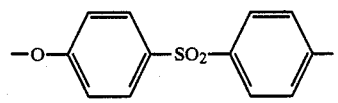

These polymers are well-known in the art and are described in for example, U.S. Pat. Nos. 4,175,175; 4,0008,203; and 4,532,288.

A preferred copolymer contains units of the following formula:

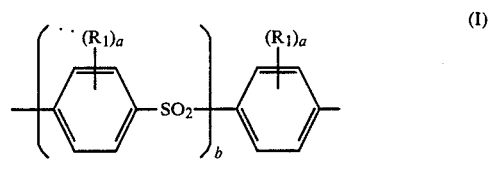

and

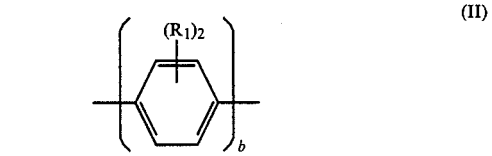

wherein $R_1$ and a are defined as above, and b is independently an integer of 1 to 3. The ratio of unit (I) to unit (II) is preferably greater than 1. Units (I) and (II) are attached to each other by an —O— bond.

The preferred copolymer contains units of the formula:

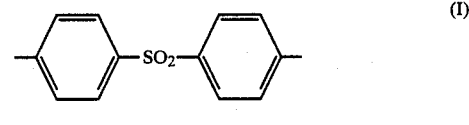

and

The polysulfone suitable for use in this invention includes homompolymers and co- and higher polymers having repeating units of the following formula:

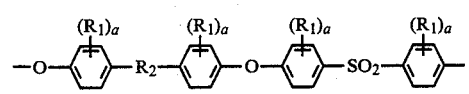

wherein $R_1$ and a are defined as above and $R_2$ is a bond between aromatic arbon atoms or a divalent connecting radical. Preferably, $R_2$ is a divalent connecting radical of the formula:

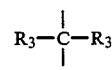

wherein $R_3$ is independently selected from lower alkyl, aryl and halogen substituted groups thereof. Preferably $R_3$ is methyl.

Preferably the polysulfone has repeating units of the formula:

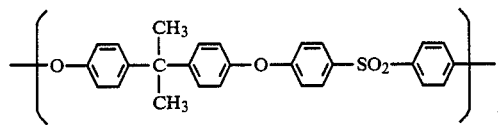

These polymers are well-known in the art and are described in, for example, U.S. Pat. No. 4,175,175.

Examples of useful poly(aryl ether)sulfones include, for example, di(hydroxyphenyl)sulfones such as bis-(4-hydroxy-phenylsulfone), 2,4'-dihydroxydiphenyl sulfone, 5-chloro-2,4'-dihydroxydiphenyl sulfone, 5'-chloro-4,4'-dihydroxydiphenyl sulfone, and the like.

The poly(aryl ether)sulfones useful in the present invention have a reduced viscosity of from about 0.30 to about 1.5 as measured in an appropriate solvent at an appropriate temperature depending on the particular polyether, such as in methylene chloride at 25° C.

The styrene polymers suitable for use herein are co- or higher polymers and include ABS type polymers, the molecules of which contain two or more polymeric parts of different compositions that are bonded chemically. The polymer is preferably prepared by polmerizing a conjugated diene, such as butadiene or a conjugated diene with a monomer copolymerizable therewith, such as styrene, to provide a polymeric backbone. After formation of the backbone, at least one grafting monomer, and preferably two, are polymerized in the presence of the polymerized backbone to obtain the graft polymer. These resins are prepared by methods well known in the art.

The backbone of the styrene polymer, as mentioned, is preferably a conjugated diene polymer such as polybutadiene, polyisoprene, or a copolymer, such as butadiene-styrene, butadiene-acrylonitrile, and the like.

The specific conjugated diene monomers normally utilized in preparing the backbone of the styrene polymer are generically described by the following formula:

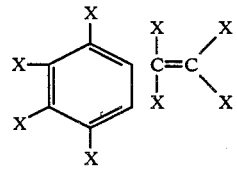

wherein X is selected from the group consisting of hydrogen, alkyl groups containing from one to five carbon atoms, chlorine or bromine. Examples of dienes that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes. A preferred conjugated diene is butadiene.

One monomer of group of monomers that may be polymerized in the presence of the prepolymerized backbone are monovinylaromatic hydrocarbons. The monovinylaromatic monomers utilized are generically described by the following formula:

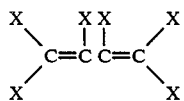

wherein X is as previosly defined. Examples of the monovinylaromatic compounds and alkly-, cycloalkyl-, aryl-, alkaryl-, aralkyl-, alkoxy-, aryloxy-, and other substituted vinylaromatic compounds include styrene, 3-methylstyrene; 3,5-diethylstyrene, 4-n-propylstyrene, α-methylstyrene, α-methyl vinyltoluene, α-chlorostyrene, α-bromostyrene, dichlorostyrene, dibromostyrene, p-tertbutylstyrene, tetra-chlorostyrene, mixtures thereof, and the like. The preferred monovinylaromatic hydrocarbons used are styrene and/or x-methylstyrene.

A second group of monomers that may be polymerized in the presence of the prepolymerized backbone are acrylic monomers such as acrylonitrile, substituted acrylonitrile and/or acrylic acid esters, exemplified by alkyl acrylates such as ethyl acrylate and methyl methacrylate, and maleic anhydride. The acrylonitrile, substituted acrylonitrile, or acrylic acid esters are described by the following formula:

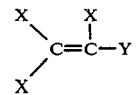

wherein X is as previously defined and Y is selected from the group consisting of cyano and carbalkoxy wherein the alkoxy group of the carbalkoxy contains from one to about twelve carbon atoms. Examples of such monomers include acrylonitrile, ethacrylonitrile, methacrylonitrile, α-chloroacrylonitrile, chloracrylonitrile, bromoacrylonitrile, and α-bromoacrylonitrile, methyl acrylate, methyl methacrylate, ethyl acrylate, butyl acrylate, propyl acrylate, isopropyl acrylate, and mixtures thereof. The preferred acrylic monomer is acrylonitrile and the preferred acrylic acid esters are ethyl acrylate and methyl methacrylate.

In the preparation of the graft polymer, the conjugated diolefin polymer or copolymer exemplified by a 1,3-butadiene polymer or copolymer comprises about 50 percent by weight of the total graft polymer composition. The monomers polymerized in the presence of the backbone, exemplified by stryene and acrylonitrile, comprise from about 40 to about 95 percent by weight of the total graft polymer composition.

The second group of grafting monomers, exemplified by acrylonitrile, ethyl acrylate or methyl methacrylate, of the graft polymer composition, preferably comprise from about 10% to about 40% by weight of the total graft copolymer composition. The monovinylaromatic hydrocarbon exemplified by styrene comprise from about 30 to about 70% by weight of the total graft polymer composition.

In preparing the polymer, it is normal to have a certain percentage of the polymerizing monomers that are grafted on the backbone combine with each other and occur as free copolymer. If styrene is utilized as one of the grafting monomers and acrylonitrile as the second grafting monomer, a certain portion of the composition will copolymerize as free styrene-acrylonitrile copolymer. In the case where α-methylstyrene (or other monomer) is substituted for the styrene in the composition used in preparing the graft polymer, a certain percentage of the composition may be an α-methylstyreneacrylonitrile copolymer. Also, there are occasions where a copolymer, such as α-methylstyrene-acrylonitrile, is added to the graft polymer copolymer blend. When the graft polymer-copolymer blend is referred to herein, it is meant optionally to include at least one copolymer blended with the graft polymer composition and which may contain up to 90% of free copolymer.

Optionally, the elastomeric backbone may be an acrylate rubber, such as one based on n-butyl acrylate, ethylacrylate, 2-ethylhexylacrylate, and the like. Additionally, elastomers such as ethylene-propylene-diene rubber and isobutyleneisoprene copolymers may be used.

The acrylate resins have a reduced viscosity of from 0.1 to about 2.0 dl/g in a one percent chloroform solution at 25° C.

Also included herein are acrylate-styreneacrylonitrile polymers which are known in the art and described, for example, in U.S. Pat. No. 3,944,631. The acrylate which may be used to prepare the polymer includes the cross-linked polymers of the $C_2$–$C_{10}$ alkyl acrylate and the $C_8$–$C_{22}$ alkyl methacrylate monomers, preferably the $C_4$–$C_8$ alkyl acrylates, such as poly(n-butyl acrylate), poly(ethyl acrylate) and poly(2-ethyl hexylacrylate). These polymers are prepared by methods well known in the art such as described in said U.S. Pat. No. 3,944,631.

The polycarbonates that are suitably employed herein are homopolymers and copolymers and mixtures thereof, which have an intrinsic viscosity of from about 0.4 to about 1.0 dl./g. as measured in methylene chloride at 25° C. The polycarbonates are prepared by reacting a dihydric phenol with a carbonate precursor. Typical of some of the dihydric phenols that may be employed are bisphenol-A, bis(4-hydroxyphenyl)methane, 2,2-bis(4-hydroxy-3-methylphenyl)propane, 4,4-bis(4-hydroxyphenyl)heptane, 2-2-(3,5,3',5'tetrabromo-4,4'dihydroxydiphenyl)propane, (3,3'dichloro-4,4'dihydroxydiphenyl)methane, and the like. Other dihydric phenols of the bisphenol type are described in, for example, U.S. Pat. Nos. 2,999,835, 3,028,365 and 3,334,154.

The carbonate precursor may be either a carbonyl halide, a carbonate ester, or a haloformate. The carbonyl halides which can be employed herein are carbonyl bromide, carbonyl chloride and mixtures thereof. Typical of the carbonate esters which may be employed herein are diphenyl carbonate, di-(halophenyl)carbonates, such as di-(chlorophenyl)carbonate or di-(bromophenyl)carbonate, etc., di-(alkylphenyl)carbonates such as di(tolyl)carbonate, di(naphthyl)carbonate, di(chloronaphthyl)carbonate, etc. or mixtures thereof. The haloformates suitable for use herein include bishaloformate of dihydric phenols for example, bischloroformates of bisphenol-A, of hydroquinone, etc. or glycols for example, bishaloformates of ethylene glycol, neopentyl glycol, polyethylene glycol, etc. While other carbonate precursors will be apparent to those skilled in the art, carbonyl chloride, also known as phosgene, is preferred.

The aromatic polycarbonate polymers may be prepared by methods well-known in the art by using phosgene or a haloformate and by employing a molecular weight regulator, an acid acceptor and a catalyst. The molecular weight regulators which can be employed in carrying out the process include monohydric phenols, such as phenol, para-tertiary-butylphenol, para-bromophenol, primary and secondary amines, etc. Preferably a phenol is employed as the molecular weight regulator.

The polycarbonates can be prepared in a one-phase (homogeneous solution) or a two-phase (interfacial) systems when phosgene, or a haloformate are used. Bulk reactions are possible when the diarylcarbonate precursors are used.

The poly(aryl ether)sulfone useful in the composition of this invention is used in amounts of from about 20 to about 85, preferably from about 30 to about 75 weight percent; the styrene and/or acrylic copolymer in amounts of from about 80 to about 15, preferably from about 70 to about 25 weight percent, and the polycarbonate in amounts of from about 0.5 to about 20, preferably from about 1 to about 10 weight percent.

It should, of course, be obvious to those skilled in the art that other additives may be included in the present compositions. These additives include plasticizers, pigments, thermal stabilizers, ultraviolet light stabilizers, flame retardants, processing aids, impact modifiers, and anti-oxidants, and the like.

The use of an anti-oxidant is particularly preferred in the composition of the present invention. Although a wide range of anti-oxidants can be used, and these are well-known in the art, a particularly preferred composition for this purpose is tetrakis (methylene(3,5-di-tert-butylhydroxyhydro-cinnamate))methane, commercially available as IRGANOX 1010, a product of Ciba-Geigy Corporation.

The impact modifiers which are particularly suitable for use herein are described in U.S. Pat. No. 4,231,922. These impact modifiers are a graft copolymer of a vinyl aromatic, an acrylate, an unsaturated nitrile, or mixtures thereof, grafted onto an unsaturated elastomeric backbone and having a tensile modulus (as measured by ASTM D-638, except that the test piece is compression molded to a 20 mil thickness) of less than about 100,000 psi, and preferably from about 15,000 to less than about 100,000 psi.

The unsaturated elastomeric backbone may be polybutadiene, poly(butadiene-co-styrene), poly(butadiene-co-acrylonitrile), or poly(isoprene). In each of the polymers there is sufficient butadiene to give the polymer a rubbery character.

The constituents which are grafted onto the unsaturated elastomeric backbone are selected from a vinyl aromatic, such as styrene, -methylstyrene, alkylstyrene or mixtures thereof; an acrylate such as the acrylic ester monomers, such as methyl acrylate, ethyl acrylate, butyl acrylate, methyl methacrylate, or mixtures thereof; an unsaturated nitrile such as acrylonitrile, methacrylonitrile, or mixtures thereof. It will be understood that the vinyl aromatic, acrylate and acrylonitrile may be used individually or in any combinations in grafting onto the unsaturated elastomeric backbone.

These impact modifiers are free-flowing powders and are commonly available as impact modifiers for poly(vinyl chloride) as described in, for example, V. Shakaypal, in "Developments in PVC Technology", edited by J. H. L. Hensen and A. Whelan, Applied Science Publishers Ltd., New York, 1973.

The grafted constituents of the impact modifier comprise from about 20 to about 60 percent by weight of said constituents such that their tensile modulus does not exceed about 100,000 psi, and is preferably between about 15,000 to less than about 100,000 psi.

The compositions of this invention are prepared by conventional mixing methods. For example, a preferred method comprises mixing the poly(aryl ether), the styrene and/or acrylic copolymer, and a polycarbonate and other optional ingredients in powder or granular form in an extruder and extruding the mixture into strands, chopping the strands into pellets and molding the pellets into the desired article.

The compositions of this invention may include mineral fillers, reinforcing agents such as fiberglass, carbon fibers, and the like. The composition may also include thermal stabilizers, ultraviolet light stabilizers, plasticizers, and the like.

EXAMPLE

The following Example serves to give a specific illustration of the practice of this invention but it is not intended in any way to limit the scope of this invention.

Two serving trays were fabricated, one from a composition within the scope of the present invention (identified in Table I as Example I tray) and one within the scope of the laminates disclosed in Example IX of Table IV of U.S. Pat. No. 4,532,288 (Comparison A of Table I herein). Both trays were fabricated from compositions containing a poly(aryl ether)sulfone, a ABS terpolymer and an antioxidant, but whereas the Comparison A Tray additionally contained a polyhydroxether and a poly(methylmethacrylate), instead the Example I tray contained a polycarbonate.

The compositions were extruded into sheets by standard extrusion techniques using a 4½ inch, 36:1 (L:D) Welex standard extruder. The die was 48 inches wide. A sheet having a thickness of 75 mils was extruded.

The sheets made in accordance with the above procedure were then thermoformed into hospital serving trays having the following dimensions: ~20 inches long, ~13 inches wide, and ~2 inches deep. The laminate was first placed into a frame and clamped. The frame was placed between two heaters which were at about 1200° F. for about 25 seconds until the sheet began to "sag" under its own weight. The temperature of the sheet at this point was between 530° and 600° F. The sheet was then placed into contact with a female mold which was in the bottom platen of a press. The female mold was raised into contact with the sheet so as to form a tight seal with the sheet. A vacuum was started and the sheet contacted the female mold. The mold temperature was about 275° to 350° F. The sheet was in contact with the female mold for about 30 seconds. The mold was retracted and the tray form was released. Total cycle time was about 90 seconds. The tray was 55-60 mil.

The serving trays were tested for the following properties: tensile strength and modulus according to ASTM D-638; elongation at break according to ASTM D-638; notched izod impact strength according to ASTM D-256, tensile impact strength according to ASTM D-1822, and Heat Deflection Temperature according to ASTM D-648-56 (Reapproved 1961).

A taste test was conducted by placing food directly into the server tray, followed by a taste panel sampling of the food to determine whether or not any adverse flavor was imparted to the food by the composition of the server tray. This taste test was conducted in accordance with the procedure given in Standard Number 14 of the National Sanitation Foundation's Standard for plastics, piping components, and related materials (revised November, 1984).

A water spotting test was also conducted based upon the repeated commercial-temperature (e.g. about 160° F. to about 180° F.) dishwashing of the server trays, followed by a visual observation, after the drying of each tray, for resulting waterspots.

TABLE I

| HOSPITAL SERVER TRAYS COMPOSITIONS AND PROPERTIES | | | |
|---|---|---|---|
| Comparison A | | Example 1 | |
| Compositon | | | |
| (1)POLYSULFONE P-3703 | 50.00% | (2)POLYSULFONE P-1700 | 55.00% |
| (3)PLEXIGLAS DRF-100 | 36.00 | (4)LEXAN 104 | 9.00 |
| (5)PHENOXY PKFE | 4.00 | (6)LUSTRAN ABS 752 | 35.80 |
| (7)ACRYLOID KM-611 | 9.80 | (8)IRGANOX 1010 | 0.20 |
| (8)IRGANOX 1010 | 0.20 | | 100.00% |
| | 100.00% | | |
| Physical Propeties | | | |
| Tensile Str. @ Break, psi. | 7650 | | 7715 |
| Elongation @ Break, % | 85 | | 127 |
| Yield Str., psi. | 7650 | | 8230 |
| Yield Elog., % | 5.0 | | 4.8 |
| Tensile Modulus, psi. | 292,000 | | 348,000 |
| Notched Izod Impact Str. ft-lbs/in. | 8.5 | | 1.5 |
| Tensile Impact Str. ft-lbs/in.$^2$ | 72 | | 30 |
| Heat Deflection Temp., 44 psi | | | |
| As Molded °F. | 279 | | 279 |
| As Annealed °F. | 300 | | 303 |
| Water Spotting | Poor | | Good |
| Taste | Unacceptable | | Satisfactory |
| (9)Bulge Resistance | Marginal | | Acceptable |

(1)This polysulfone has a number average molecular weight of 21,000 and a composition Melt Flow at 343° C. and 44 psi. of 17.5 grams per 10 min.
(2)This polysulfone has a number average molecular weight of 27,000 and a composition Melt Flow at 343° C. and a 44 psi. of 6.5 grams per 10 min.
(3)Poly(methylmethacrylate) impact modified with a butadiene based elastomer
(4)Polycarbonate
(5)A polyhydroxyether which is the reaction product of bisphenol A and epichlorohydrin having a reduced viscosity of 0.43 dl/g as measured as 0.2 g/100 ml. in tetrahydrofuran at 25° C., a product of Union Carbide Corporation.
(6)A styrene/acrylate/butadiene terpolymer sold by Monsanto Company and having tensile modulus of 320,000 psi.
(7)A styrene/acrylate/butadiene terpolymer sold by Rohm and Haas Company and having a tensile modulus of 43,600 psi.
(8)An antioxidant sold by Ciba-Geigy with the active Ingredient Tetrakis (methylene(3,5-di-tert-butyl-hydroxyhydro-cinnamate))methane.
(9)Ability of the server tray to resist deformation when cleaned repeatedly in commercial dishwashers. Performance is a combination of modulus and heat deflection temp. Since Example 1 tray is better than Comparison tray in both properties, bulge resistance is better.

The results as given in Table I show that the Example I tray exhibits improved physical properties, as compared to the Comparison A tray with respect to tensile modulus (348,000 psi. vs. 292,000 psi, respectively). In addition, the Example I tray exhibits good resistance to water spotting, as well as the taste effect of food that comes in contact with the tray.

What is claimed is:

1. A serving tray fabricated from a blend comprising from about 20 to about 85 weight percent of a poly(aryl ether)sulfone polymer, from about 80 to about 15 weight percent of a styrene polymer, and a compatibilizing amount of a polycarbonate.

2. An article as defined in claim 1 wherein the poly(aryl ether) has repeating units of the formula:

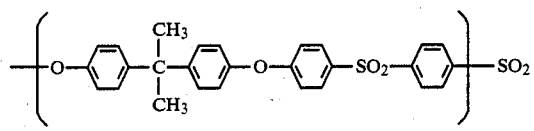

3. An article as defined in claim 1 wherein the poly(aryl ether) has repeating units of the formula:

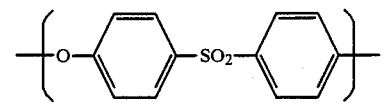

4. An article as defined in claim 1 wherein the styrene polymer is prepared by polymerizing a conjugated diene monomer with a monomer copolymerizable therewith to provide an elastomeric backbone and thereafter grafting at least one grafting monomer onto said backbone.

5. An article as defined in claim 1 wherein the styrene copolymer is butadiene/styrene/acrylonitrile resin.

6. An article as defined in claim 1 wherein the styrene polymer is an acrylate-styrene-acrylonitrile polymer.

7. An article as defined in claim 1 wherein the styrene polymer is present in amounts of from about 15 to about 80 weight percent.

8. An article as defined in claim 1 wherein the polycarbonate is present in amounts of from about 0.5 to about 20 weight percent.

9. An article as defined in claim 1 which contains an impact modifier which is a graft copolymer of a vinyl aromatic, an acrylate, an unsaturated nitrile, or mixtures thereof, grafted onto an unsaturated elastomeric backbone and having a tensile modulus of less than about 100,000 psi.

* * * * *